(12) United States Patent
Barnikel et al.

(10) Patent No.: US 8,163,401 B2
(45) Date of Patent: Apr. 24, 2012

(54) COMPONENT HAVING A COATING SYSTEM

(75) Inventors: Jochen Barnikel, Mülheim an der Ruhr (DE); Friedhelm Schmitz, Dinslaken (DE)

(73) Assignee: Siemens Aktiengesellschaft, Munich (DE)

( * ) Notice: Subject to any disclaimer, the term of this patent is extended or adjusted under 35 U.S.C. 154(b) by 407 days.

(21) Appl. No.: 12/432,099

(22) Filed: Apr. 29, 2009

(65) Prior Publication Data

US 2009/0233122 A1 Sep. 17, 2009

(51) Int. Cl.
*B32B 15/04* (2006.01)
*B32B 18/00* (2006.01)
*B32B 15/18* (2006.01)

(52) U.S. Cl. ........ 428/632; 428/633; 428/666; 428/679; 428/680; 428/681; 428/682; 416/241 R

(58) Field of Classification Search ................ None
See application file for complete search history.

(56) References Cited

U.S. PATENT DOCUMENTS

| | | | | |
|---|---|---|---|---|
| 5,154,885 A * | 10/1992 | Czech et al. | ............... | 420/588 |
| 5,939,204 A * | 8/1999 | Czech | ............... | 428/469 |
| 6,024,792 A | 2/2000 | Kurz et al. | | |
| 6,207,297 B1 | 3/2001 | Sabol et al. | | |
| 6,306,524 B1 | 10/2001 | Spitsberg et al. | | |
| 6,455,167 B1 | 9/2002 | Rigney et al. | | |
| 6,644,917 B2 * | 11/2003 | Zhao et al. | .................... | 415/200 |
| 7,364,801 B1 * | 4/2008 | Hazel et al. | .................... | 428/632 |
| 2005/0118334 A1 | 6/2005 | Gorman et al. | | |
| 2007/0116980 A1 * | 5/2007 | Schmitz et al. | .................... | 428/681 |

FOREIGN PATENT DOCUMENTS

| | | |
|---|---|---|
| EP | 0 892 090 A1 | 1/1999 |
| EP | 1 204 776 B1 | 5/2002 |
| EP | 1 306 454 A1 | 5/2003 |
| EP | 1 319 729 A1 | 6/2003 |
| EP | 1 528 124 A2 | 5/2005 |
| EP | 1 541 713 A1 | 6/2005 |
| JP | 62192536 A * | 8/1987 |
| WO | WO 99/67435 A1 | 12/1999 |
| WO | WO 00/44949 A1 | 8/2000 |

* cited by examiner

*Primary Examiner* — Aaron Austin

(57) ABSTRACT

The invention relates to a component having a coating system, which comprises at least one bonding coat applied directly onto the component and at least one thermal barrier coat formed on the bonding coat, the bonding coat comprising from 22 to 36 wt. % Cr, from 15 to 30 wt. % Ni, at most 55 ppm Al, and Fe as a basis.

25 Claims, 3 Drawing Sheets

Figure 4:
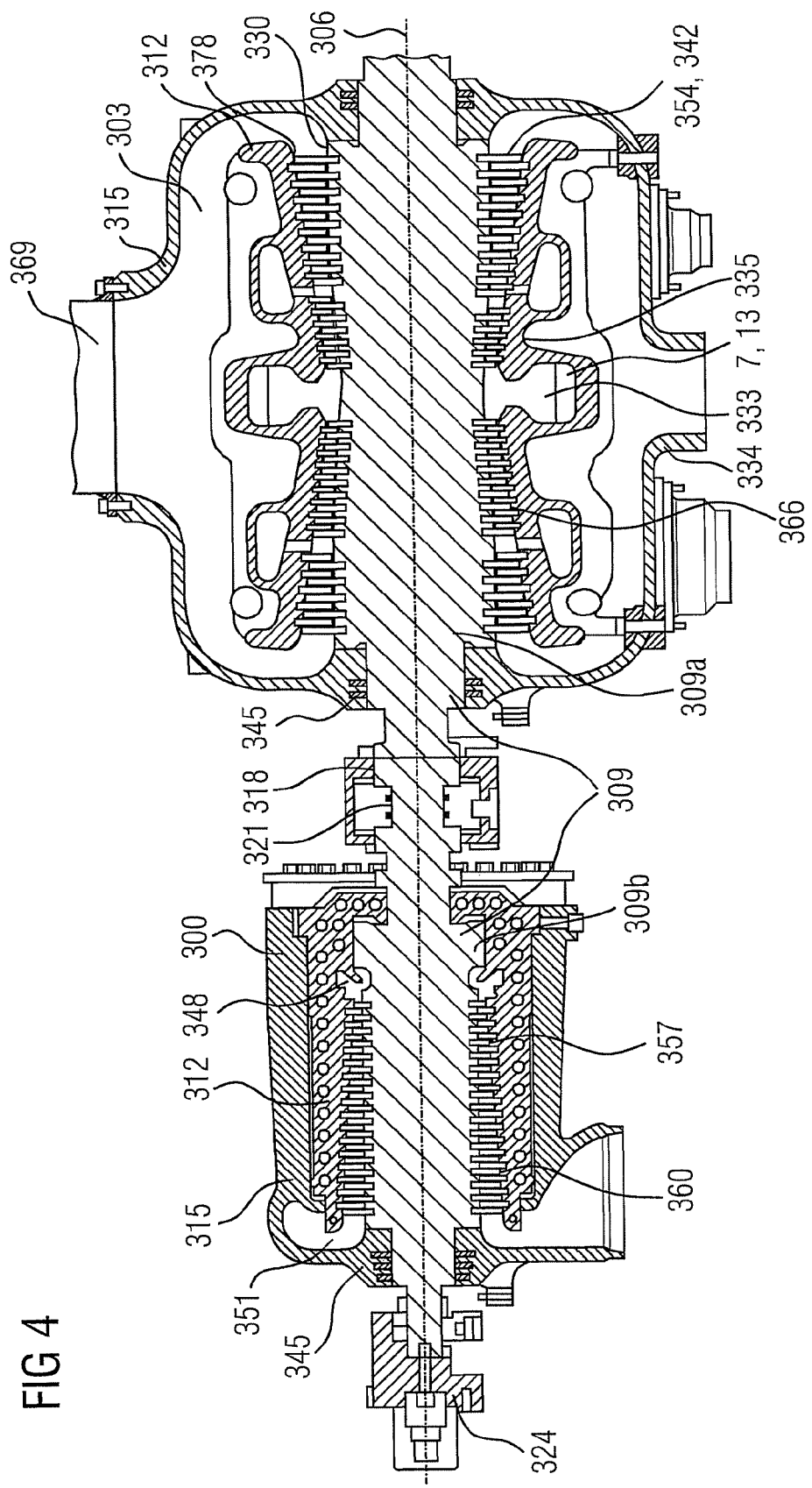

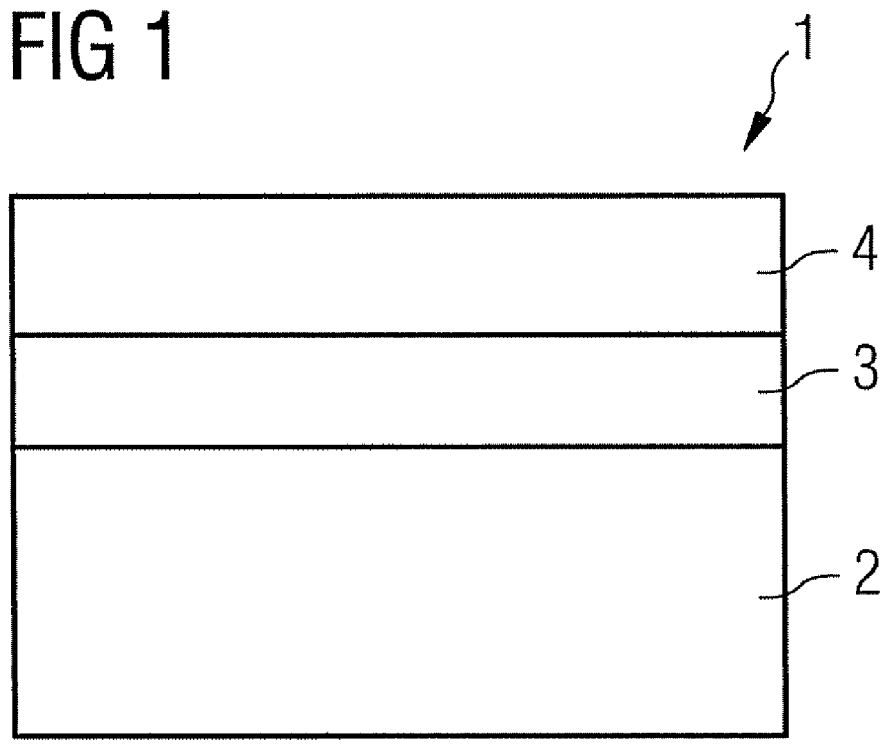
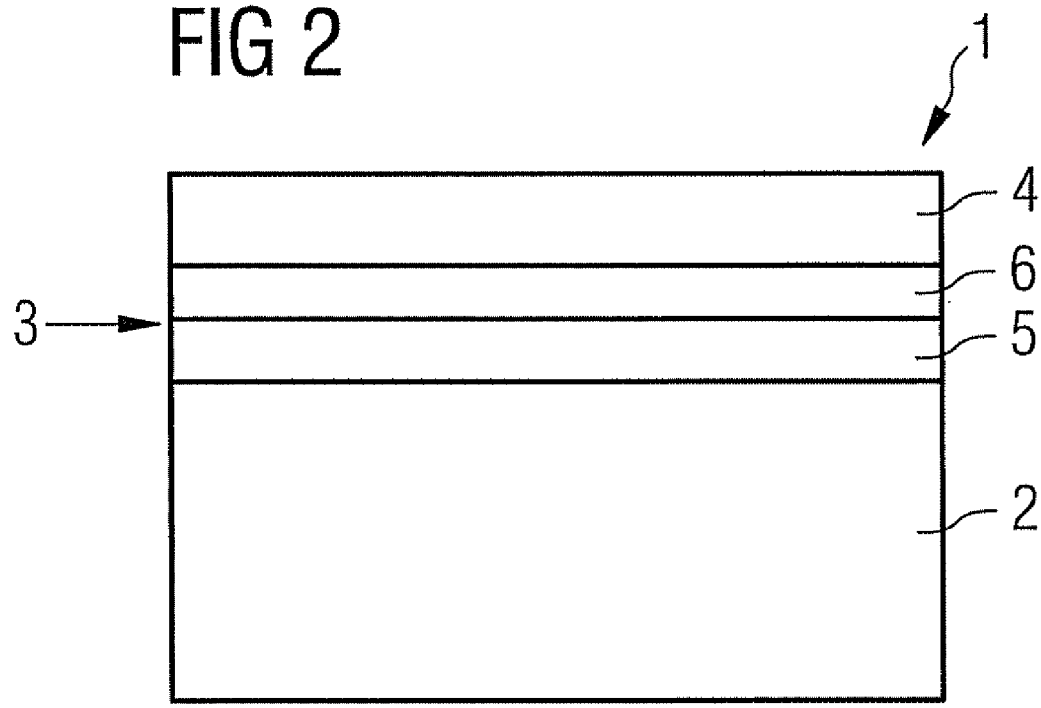

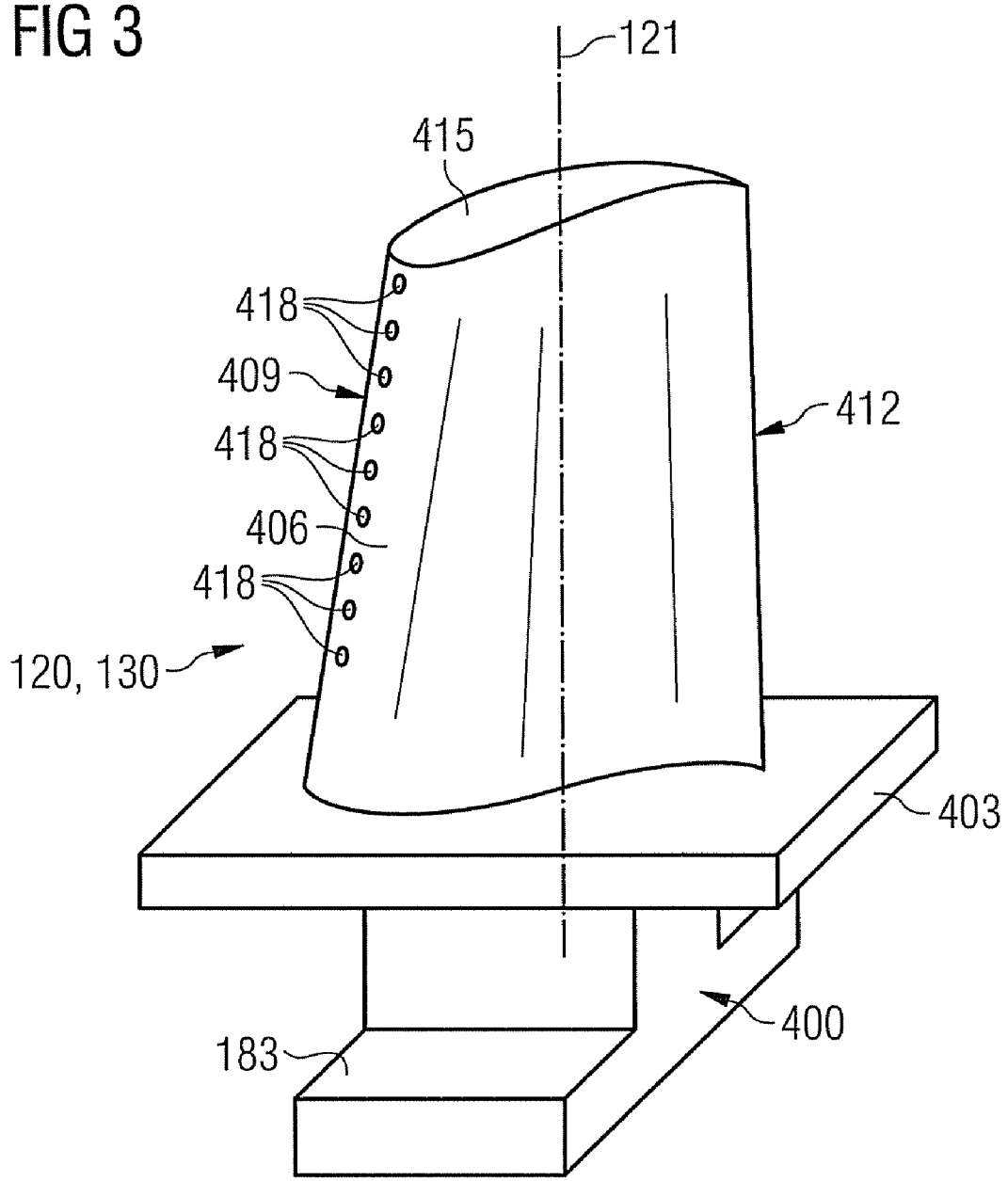

COMPONENT HAVING A COATING SYSTEM

CROSS REFERENCE TO RELATED APPLICATIONS

This application claims priority to U.S. application Ser. No. 11/895,233 filed Aug. 23, 2007 which incorporated by reference herein in its entirety. This application claims priority of European application No. 06017533.8 filed Aug. 23, 2006, which is incorporated by reference herein in its entirety.

FIELD OF INVENTION

The invention relates to a component having a coating system, which comprises at least one bonding coat applied directly on the component and a thermal barrier coat formed on the bonding coat.

BACKGROUND OF INVENTION

Components which are exposed to high temperatures and corrosive conditions must be provided with special coatings, in order to protect them against damage and therefore ensure a longer service life. Currently, in particular for components of steam or gas turbines, coating systems are used which consist of a plurality of layers applied on one another. These often comprise at least one bonding coat, which is applied directly on the component, and a thermal barrier coat applied thereon.

In many cases the bonding coat has the general composition MCrAlY, where M stands for at least one of the elements in the group comprising iron, cobalt and nickel, and Y is yttrium or another equivalent element in the group comprising scandium and the rare earth elements. The purposes of the bonding coat are on the one hand to protect against corrosion and/or oxidation and on the other hand to ensure strong bonding of the thermal barrier coat on the component.

The thermal barrier coat in turn often consists of ceramic materials, which may contain zirconium oxide. Only its capacity for strong thermal insulation makes it possible to use the components in temperature ranges >1000° C.

Corresponding protective coats and coat systems are described, for example, in EP 1 541 713 A1.

In the known bonding coats, inter-diffusion phenomena between the metal alloy of the base material of the component and the constituents of the bonding coat may take place in a temperature range >550° C., so that undesired phase formation may occur. This entails degradation of the base material properties, which reduces the service life of the component. Minimal inter-diffusion of the alloy elements between the bonding coat and the base material, which does not degrade the properties of the base material, is nevertheless desirable since the bonding between the base material and the bonding coat is thereby improved significantly. Furthermore, the oxidation and corrosion behavior of the base material in the superficial region can be improved in this way.

SUMMARY OF INVENTION

It is an object of the present invention to provide a component having a coating system, which minimizes the inter-diffusion of the alloy constituents between the base material of the component and the constituents of the bonding coat so that precisely the degree of intermixing required for optimal bonding of the bonding coat on the component is achieved and, at the same time, the base material properties are not degraded.

The object is achieved according to the invention in that the bonding coat comprises from 22 to 36 wt. % Cr, from 15 to 30 wt. % Ni, at most 55 ppm Al, and Fe as a basis. A bonding coat is thus used which contains primarily iron, chromium, nickel, and in which only a small amount of aluminum is contained.

The advantage of the component according to the invention is that the bonding coat is designed as a blocking coat, which minimizes the inter-diffusion between the constituents of the base body and those of the bonding coat. This ensures that no undesired phases and mixed structures are formed, but on the other hand it allows a certain degree of inter-diffusion which permits optimal bonding of the bonding coat on the base material. Furthermore, the base material of the component does not have its properties degraded.

According to a preferred embodiment of the invention, the bonding coat may additionally contain from 1 to 3 wt. % Si. It is furthermore possible for the bonding coat additionally to contain Ce, Y and/or Hf. All these additives lead to an improvement in the oxidation resistance of the bonding coat.

According to another embodiment, the bonding coat may contain 25 wt. % Cr and 20 wt. % Ni. It is likewise possible to provide a bonding coat having 30 wt. % Cr and 30 wt. % Ni.

The bonding coat is advantageously designed as a blocking coat, which minimizes the inter-diffusion between the component and the bonding coat. This ensures that no undesired phases and mixed structures occur in the base material.

According to another embodiment of the invention, the bonding coat is designed in multiple layers. In this case, the first layer applied directly on the component acts as a blocking coat for the further layers formed on the first layer. This is achieved in that the first layer minimizes the inter-diffusion between the constituents of the component and those of the further layer.

It has been found that the component according to the invention can be obtained with high temperature, corrosion and oxidation resistance when the thermal barrier coat consists of a ceramic, for example based on zirconium oxide.

According to another embodiment of the invention, the material of the substrate comprises or consists of steel. In one aspect, the steel includes chromium. Additionally, the steel may comprise or consist of an alloy that does not include nitrogen. Alternately, the steel may comprise or consist of an alloy that includes nitrogen. Furthermore, the steel may be a ferretic steel.

Tests have furthermore shown that the component according to the invention may preferably be a part of a turbine, for instance a turbine blade. In this case, particular longevity of the heavily loaded components is achieved.

SUMMARY OF INVENTION

The invention will be explained in more detail below with the aid of two exemplary embodiments with reference to the appended drawings, in which:

FIG. 1 shows a schematic cross section through a first component according to the invention, FIG. 2 shows a schematic cross section through a second component according to the invention, FIG. 3 shows a perspective view of a rotor blade or a guide vane of a turbomachine, FIG. 4 shows a steam turbine in a longitudinal partial section.

DETAILED DESCRIPTION OF INVENTION

FIG. 1 shows a schematic cross section through a first component 1 according to the invention, which may be a turbine blade 120, 130. The component 1 consists of a base body 2, which in this case consists of a nickel-based alloy. A bonding coat 3, which consists of from 22 to 36 wt. % Cr, from 15 to 30 wt. % Ni, at most 50 ppm Al, and Fe as a basis, is applied surface-wide on this base body 2. The bonding coat 3 may additionally contain Si, Ce, Y and/or Hf as well, an Si content of from 1 to 3 wt. % in particular being advantageous. A thermal barrier coat 4, which in this case consists of a ceramic based on zirconium oxide, it is in turn applied surface-wide on the bonding coat 3. The bonding coat 3 is designed as a blocking coat, which minimizes the inter-diffusion between the constituents of the base body and those of the bonding coat. This ensures that no undesired phases and mixed structures are formed in the base material, but on the other hand it allows a certain degree of inter-diffusion which permits optimal bonding of the bonding coat on the base material.

In another embodiment, the material of the base body 2 comprises steel or the base body 2 consists of steel. The steel may include chromium. For example, 1% to 2.5 wt % chromium, 10% wt. chromium, 12 wt % chromium. Additionally, the steel may comprise or consist of an alloy that does not include nitrogen. Alternately, the steel may include nitrogen. Furthermore, the steel may be a ferretic steel. Thus, with the bond coat 3 having a lower amount of nickel, which together with an iron base substrate would cause a high amount of diffusion due to the difference in the concentration of the nickel and the base material.

In order to produce the component 1 according to the invention, in a first step the bonding coat 3 is applied surface-wide on the base body 2 with the aid of coating methods known in the prior art, for example APS, HVOF and LPPS being suitable. In a second step, the thermal barrier coat is subsequently applied surface-wide as an outer coating on the bonding coat. The aforementioned methods known in the prior art are also suitable for this.

FIG. 2 shows a second embodiment of a component 1 according to the invention in a schematic section. It is a turbine blade 120, 130 the gas turbine 100, which comprises a base body 2 that consists of a nickel superalloy. A multilayer bonding coat 3 is formed on the surface of the base body 2, a first layer 5 being arranged directly on the base body 2. A further layer 6 is applied on the first layer 5. The first layer 5 acts as a blocking coat for the further coat 6, in that it minimizes the inter-diffusion between the constituents of the base body 2 and those of the further layer 6. The first layer 5 has a composition of from 22 to 36 wt. % Cr, from 15 to 30 wt. % Ni, at most 50 ppm Al, from 1 to 3 wt. % Si, and Fe as a basis. The further layer 6 is coated surface-wide with a thermal barrier coat 4, which consists of a ceramic and contains zirconium oxide.

In another embodiment, the material of the base body 2 comprises steel or the base body 2 consists of steel. The steel may include chromium. For example, 1% to 2.5 wt % chromium, 10% wt. chromium, 12 wt % chromium. Additionally, the steel may comprise or consist of an alloy that does not include nitrogen. Alternately, the steel may include nitrogen. Furthermore, the steel may be a ferretic steel. Thus, with the bond coat 3 having a lower amount of nickel, which together with an iron base substrate would cause a high amount of diffusion due to the difference in the concentration of the nickel and the base material.

In order to produce the component 1 according to the invention, the first layer 5 of the bonding coat 3 is first applied surface-wide on the base body 2 of the component 1. The coating methods known in the prior art and already mentioned above may be used for this. Similarly, the further layer 6 is then initially applied on the first layer 5 and then the thermal barrier coat 4 is applied thereon with the aid of coating methods.

As already mentioned above, the component according to the invention may be a turbine blade.

In both cases, the bonding coat 3 preferably has a density ≧95% of the theoretical density.

FIG. 3 shows in perspective view such a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening region 400, a blade platform 403 adjacent thereto and a blade surface 406 and a blade tip 415.

As a guide vane 130, the vane 130 has a further platform (not shown) at its vane tip 415.

A blade root 183 which is used to fasten the rotor blades 120, 130 on a shaft or a disk (not shown) is formed in the fastening region 400.

The blade root 183 is configured, for example, as a hammerhead. Other configurations as a fir-tree or dovetail root are possible.

The blade 120, 130 comprises a leading edge 409 and a trailing edge 412 for a medium which flows past the blade surface 406.

In conventional blades 120, 130, for example, solid metallic materials, in particular superalloys, are used in all regions 400, 403, 406 of the blade 120, 130.

Such superalloys are known, for example, from EP 1 204 776 B1, EP 1 306 454, EP 1 319 729 A1, WO 99/67435 or WO 00/44949; these documents are part of the disclosure in respect of the chemical composition of the alloy.

The blades 120, 130 may in this case be manufactured by a casting method, also by means of directional solidification, by a forging method, by a machining method or combinations thereof.

Workpieces with a monocrystalline structure or structures are used as components for machines which are exposed to heavy mechanical, thermal and/or chemical loadings during operation.

Such monocrystalline workpieces are manufactured, for example, by directional solidification from the melts. These are casting methods in which the liquid metal alloy is solidified to form a monocrystalline structure, i.e. to form the monocrystalline workpieces, or directionally.

Dendritic crystals are in this case aligned along the heat flux and form either a rod crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (monocrystalline) solidification in this method, since nondirectional growth will necessarily form transverse and longitudinal grain boundaries which destroy the good properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures.

Such methods are known from U.S. Pat. No. 6,024,792 and EP 0 892 090 A1; these documents are part of the disclosure in respect of the solidification method.

The blades 120, 130 may likewise comprise coatings against corrosion or oxidation.

A protective oxide coat (TGO=thermal grown oxide coat), in particular an aluminum oxide coat, is formed on the corrosion protection coat (as an interlayer or as the outermost coat).

On the corrosion protection coat, there may also be a thermal barrier coat which is preferably the outermost coat and consists for example of $ZrO_2$, $Y_2O_3$—$ZrO_2$, i.e. it is not stabilized or is partially or fully stabilized by yttrium oxide and/or calcium oxide and/or magnesium oxide.

The thermal barrier coat covers the entire corrosion protection coat.

Rod-shaped grains are produced in the thermal barrier coat by suitable coating methods, for example electron beam vapor deposition (EB-PVD).

Other coating methods are conceivable, for example atmospheric plasma spraying (APS), LPPS, VPS or CVD. The thermal barrier coat may comprise grains which are porous or affected by micro- or macrocracks for better thermal shock resistance. The thermal barrier coat is thus preferably more porous than the corrosion protection coat.

The blade 120, 130 may be configured to be hollow or solid.

If the blade 120, 130 is intended to be cooled, then it is hollow and optionally also comprises film cooling holes 418 (indicated by dashes).

FIG. 4 shows a steam turbine 300, 303 having a turbine shaft 309 extending along a rotation axis 306.

The steam turbine comprises a high-pressure turbine part 300 and a medium-pressure turbine part 303, each with an inner housing 312 and an outer housing 315 enclosing the latter. The high-pressure turbine part 300 is, for example, configured in pot design. The medium-pressure turbine part 303 is, for example, configured to be twin-streamed. It is likewise possible for the medium-pressure turbine part 303 to be configured to be single-streamed.

A bearing 318 is arranged along the rotation axis 306 between the high-pressure turbine part 300 and the medium-pressure turbine part 303, the turbine shaft 309 comprising a bearing region 321 in the bearing 318. The turbine shaft 309 is mounted on a further bearing 324 beside the high-pressure turbine part 300. In the region of this bearing 324, the high-pressure turbine part 300 comprises a shaft seal 345. The turbine shaft 309 is sealed relative to the outer housing 315 of the medium-pressure turbine part 303 by two further shaft seals 345. Between a high-pressure steam intake region 348 and a steam outlet region 351, the turbine shaft 309 in the high-pressure turbine part 300 comprises the high-pressure rotor blading 357. With the associated rotor blades (not represented in detail), this high-pressure rotor blading 357 constitutes a first blading region 360.

The medium-pressure turbine part 303 comprises a central steam intake region 333. Associated with the steam intake region 333, the turbine shaft 309 comprises a radially symmetric shaft shield 363, a cover plate, on the one hand to divide the steam flow into the two streams of the medium-pressure turbine part 303 and also to prevent direct contact of the hot steam with the turbine shaft 309. In the medium-pressure turbine part 303, the turbine shaft 309 comprises a second blading region 366 with the medium pressure rotor blades 354. The hot steam flowing through the second blading region 366 flows from the medium-pressure turbine part 303 out of a discharge port 369 an to a low-pressure turbine part connected downstream.

The turbine shaft 309 is composed for example of two turbine shaft parts 309a and 309b, which are connected firmly to one another in the region of the bearing 318. Each turbine shaft part 309a and 309b comprises a cooling line 372 formed as a central bore 372a long the rotation axis 306. The cooling line 372 is connected to the steam outlet region 351 via a feed line 375 comprising a radial bore 375a. In the medium-pressure turbine part 303, the coolant line 372 is connected to a cavity (not shown) below the shaft shield. The feed lines 375 are configured as a radial bore 375a, so that "cold" steam from the high-pressure turbine part 300 can flow into the central bore 372a. Via the discharge line 372, also formed in particular as a radially directed bore 375a, the steam passes through the bearing region 321 into the medium-pressure turbine part 303 and there onto the lateral surface 330 of the turbine shaft 309 in the steam intake region 333. The steam flowing through the cooling line is at a much lower temperature than the temporarily superheated steam flowing into the steam intake region 333, so as to ensure effective cooling of the first rotor blade row 342 of the medium-pressure turbine part 303 and the lateral surface 330 in the region of this rotor blade row 342.

We claim:

1. A component having a coating system, comprising:
    a bonding coat arranged directly on the component;
    a thermal barrier coat arranged on the bonding coat wherein the bonding coat consisting essentially of:
    22 to 36 wt. % Cr,
    15 to 30 wt. % Ni,
    at most 55 ppm Al, and
    remainder Fe; and
    a substrate comprising steel.

2. The component as claimed in claim 1, wherein the steel comprises
    1-2.5 wt. % chromium.

3. The component as claimed in claim 2, wherein the bonding coat further comprises Ce, Y and/or Hf.

4. The component as claimed in claim 2, wherein the bonding coat further comprises at least one element selected from the group consisting of: cerium, yttrium, and hafnium.

5. The component as claimed in claim 2, wherein the bonding coat contains 25 wt. % Cr and 20 wt. % Ni.

6. The component as claimed in claim 2, wherein the bonding coat is a blocking coat that minimizes the inter-diffusion between the component and the bonding coat.

7. The component as claimed in claim 2, wherein the bonding coat contains 30 wt. % Cr and 30 wt. % Ni.

8. The component as claimed in claim 7, wherein the bonding coat comprises multiple layers.

9. The component as claimed in claim 8, wherein a first layer of the multiple layer bonding coat applied on the component is a blocking coat for a further layer arranged on the first layer, and the first layer minimizes the inter-diffusion between the component and the further layer.

10. The component as claimed in claim 9, wherein the thermal barrier coat contains a ceramic.

11. The component as claimed in claim 9, wherein the thermal barrier coat consists of a ceramic.

12. The component as claimed in claim 11, wherein the component consists of a substrate, a bonding coat and a thermal barrier coat.

13. The component as claimed in claim 12, wherein the ceramic is based on zirconium oxide.

14. The component as claimed in claim 13, wherein the component is a turbine component.

15. The component as claimed in claim 1, wherein the steel comprises 12 wt. % chromium.

16. The component as claimed in claim 15, wherein the steel does not include nitrogen.

17. The component as claimed in claim 1, wherein the steel does not include nitrogen.

18. The component as claimed in claim 1, wherein the steel is a ferretic steel.

19. The component as claimed in claim 18, wherein the steel comprises 10 wt. % chromium.

20. The component as claimed in claim 19, wherein the steel includes nitrogen.

21. The component as claimed in claim 18, wherein the steel includes nitrogen.

22. The component as claimed in claim 1, wherein the steel comprises 10 wt. % chromium.

23. The component as claimed in claim 1, wherein the bonding coat further comprises 1 to 3 wt. % Si.

24. The component as claimed in claim 1, wherein the bonding coat further comprises at least one element selected from the group consisting of: cerium, yttrium and hafnium.

25. A component having a coating system, consisting essentially of:
   a bonding coat arranged directly on the component;
   a thermal barrier coat arranged on the bonding coat wherein the bonding coat comprises:
   22 to 36 wt. % Cr,
   15 to 30 wt. % Ni,
   at most 55 ppm Al, and
   remainder Fe; and
   a substrate comprising steel.

* * * * *